Dec. 7, 1948. G. S. SCHAIRER 2,455,385
ALTERNATE PASSAGE DOUBLE RING COWL
Filed Feb. 10, 1943 2 Sheets-Sheet 1

Inventor
GEORGE S. SCHAIRER
By Reynolds & Beach
Attorneys

Dec. 7, 1948.   G. S. SCHAIRER   2,455,385
ALTERNATE PASSAGE DOUBLE RING COWL
Filed Feb. 10, 1943   2 Sheets-Sheet 2

Inventor
GEORGE S. SCHAIRER
By Reynolds & Beach
Attorneys

Patented Dec. 7, 1948

2,455,385

UNITED STATES PATENT OFFICE 2,455,385

ALTERNATE PASSAGE DOUBLE RING COWL

George S. Schairer, Seattle, Wash., assignor to Boeing Airplane Company, a corporation of Delaware Application February 10, 1943, Serial No. 475,399

9 Claims. (Cl. 244—57)

My invention relates to aircraft cooling installations. As an example, it may be applied to radiators installed within or alongside an airplane wing or other aircraft structure. As another example my invention is applicable to ring cowl installations for radial, air-cooled aircraft engines. Such installations are designed to minimize the drag at the airflow through them required for normal operating conditions. To afford controlled cooling, and to maintain such air flow substantially constant at different air speeds, flaps for regulating the opening through such radiators or ring cowls have been used. As such flaps are moved toward closed position, however, at high air speeds the velocity of the air flowing outward and over the leading edge of the cowl ring or flow passage may become excessive, so that normal flow characteristics are disturbed. Under such conditions the resistance of the structure becomes considerably greater than when the air speed is relatively low and the flaps are thus positioned. The effectiveness of the ring cowling or other fairing to reduce air resistance has thus been partially defeated at high air speeds.

It is an object of my invention to maintain substantially constant the quantity of air flowing through a cooling installation, so that the aerodynamic characteristics of the aircraft structure adjacent to such installation will not be altered as the passage for flow of air over the heat transfer surfaces is restricted, even though the air speed may be high.

It is a further object to control the aerodynamic characteristics of aircraft surfaces housing the cooling installation or located close to it in this manner whether the cooling system be for an engine of the air-cooled type, so that the air flows directly in contact with the engine cylinders, or for a liquid-filled radiator through which air may flow.

Particularly it is an object to reduce the drag of cooling installations when flow through an aircraft structure encircling cooling passage past the heat radiating surfaces is restricted at high air speeds, by employing a single flap means operable to proportion the air flow between a by-pass passage through such aircraft structure and the cooling passage.

To illustrate representative types of installations to which my invention may be applied I have shown in the drawings a radial, air-cooled aircraft engine within a ring cowl, and a radiator installation housed within an airplane wing, both of which incorporate my air flow controlling mechanism.

Ring cowls for radial air-cooled aircraft engines conventionally have gaps between their trailing edges and the adjacent aircraft structure, and the effective opening of such gaps is controllable by gill flaps. By regulating the degree of opening of these flaps the passage for flow of cooling air past the engine cylinders may be restricted. To maintain a constant flow of air through the cowl ring at high air speeds, or to reduce such flow during descent of the airplane, these flaps are moved to restrict the cooling air passage.

When the flaps are closed considerably a larger proportion of the air ahead of the engine must pass around the outside of the cowl ring instead of through it. Consequently the velocity of the cowl's leading edge relative to the air flowing outward over it is considerably higher than the air speed of the airplane. If the latter speed is high the character of the air flow over the cowl's leading edge will be such as to create great resistance. When the passage through the cowl is not appreciably restricted the air immediately in front of the engine passes through the cowl ring instead of radially outward over its leading edge, so that the relative velocity of the cowl ring's leading edge to the air is not appreciably greater than the air speed of the whole airplane and no excessive air resistance occurs at the same high air speeds.

Figure 1:
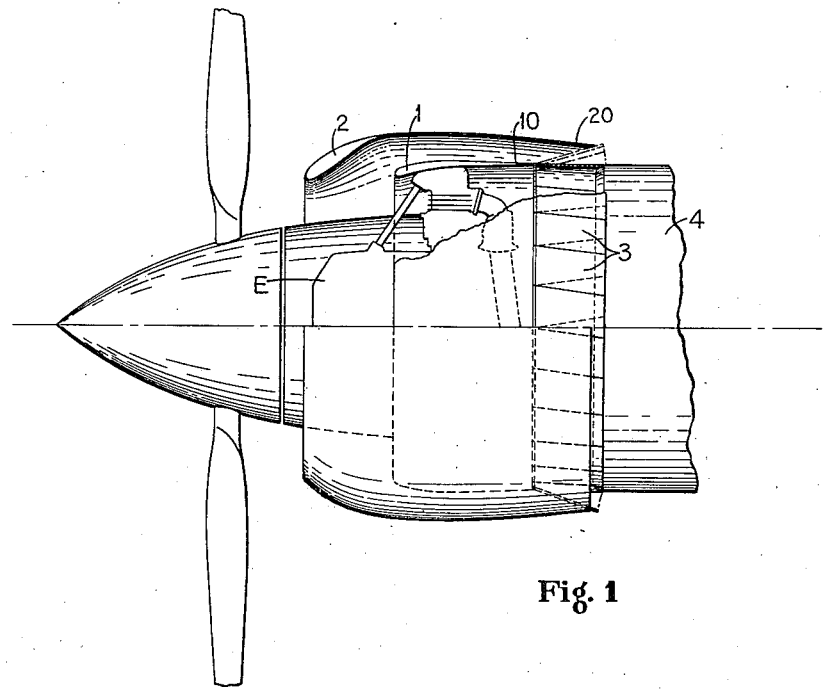
Figure 1 is a side elevation view of the air-cooled engine embodiment of my device, showing parts in section.
Figure 2:
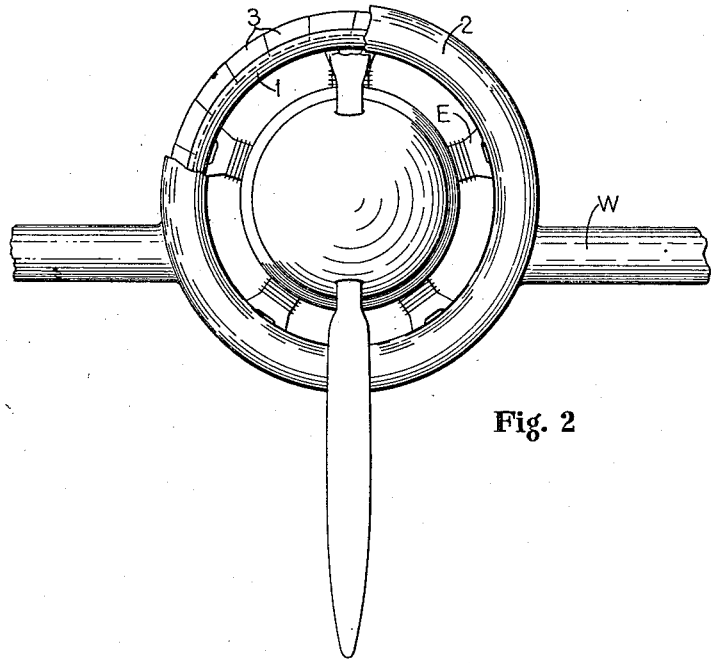
Figure 2 is a front elevation view of the installation shown in Figure 1 with part of the cowl broken away.

The disadvantage of relatively high drag at high air speeds accompanying restricted flow through previous ring cowls for radial engines is eliminated by the representative installation shown in Figures 1 and 2. On an outboard engine E carried by an airplane wing W is mounted an inner cowl ring I closely encircling the cylinder heads and rocker boxes. This ring may be suitably secured directly to components of the engine, and preferably extends only a short distance in front of and behind the cylinders. The provision of conventional intercylinder baffles insures that all the air flowing through this ring will be utilized efficiently to remove heat from the engine. Because the area within the cowl ring is occupied principally by the engine itself and by such baffles the actual area remaining for flow of air through it is only a small fraction of the total frontal area which it encloses.

The outer cowl ring 2, concentric with cowl ring 1, is spaced outwardly from it a distance such that the frontal area of the intermediate annular space is not substantially less than the aggregate area of the effective openings within ring 1. Such annular space constitutes an unobstructed passage through which air circumventing the cooling surfaces may flow. Ring 2 extends a substantial distance forward of the leading edge of ring 1, and its forward portion is inclined inwardly so that its leading edge is generally of the same diameter as the leading edge of ring 1. Ring 2 also extends rearward beyond ring 1 for a substantial distance. Control flaps 3 are provided to govern the path taken by the discharge air flowing through cowl ring 2. Preferably these flaps are hinged to the trailing edge 10 of the inner ring to control the discharge opening, but they might be mounted in any other suitable manner. These flaps are of a length sufficient to bridge between the two rings as shown in broken lines in Figure 1, as well as between the inner cowl ring and an adjacent portion of the aircraft structure, such as the nacelle 4.

When the flaps 3 are in the solid line position shown in Figure 1 the opening between the trailing edge 10 of the inner cowl ring and the engine nacelle is closed, so that no air can flow through it. Air may still flow into ring 2, however, and pass through the annular passage between rings 1 and 2, and out through the opening between the trailing edge 20 of the outer ring and the radially inner continuous surface formed by the control flaps and nacelle 4.

When the flaps 3 are swung from their solid line position in Figure 1 to that shown in broken lines in Figure 1 and in solid lines in Figure 2, they close the annular opening between the cowl rings, while at the same time opening to the fullest extent the cooling passages through the inner ring 1. Since, as previously stated, the net area of the openings through the inner cowl ring is not substantially greater than the area of the by-pass passage between the rings transversely of the direction of air flow, the quantity of air entering ring 2 is not appreciably diminished by closing the engine passages. Preferably the aggregate area transversely of the direction of flight of the portions of both passages controlled by the flaps is approximately the same whatever position the flaps assume. As the flap opens one passage by a given amount it closes the other compensatively, i. e. to the same degree, so that the flow of air into ring 2 will at all times be approximately the optimum value for which it was designed. Moreover, it will be noted that a jet, or compound jet discharge action of the air leaving the double ring assembly occurs in all adjusted positions of the flaps.

Any suitable type of mechanism may be used to operate the control flaps 3, but it should be capable of holding them in any desired intermediate position so that the proportionate flow through the engine of the air entering the composite cowl structure may be precisely regulated at will.

Figure 3:
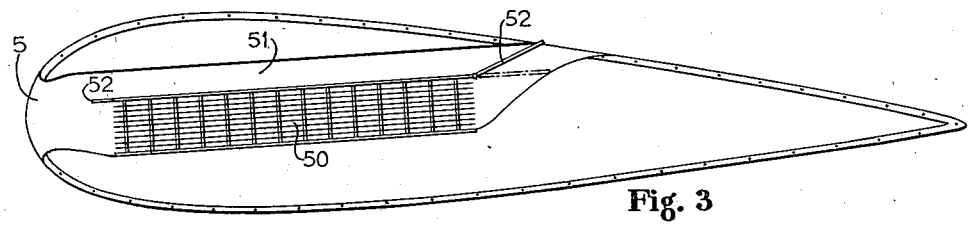
Figure 3 is a vertical section through an airplane wing transversely of its length, showing a radiator for a liquid-cooled engine housed in an air passage through the wing.
Figure 4:
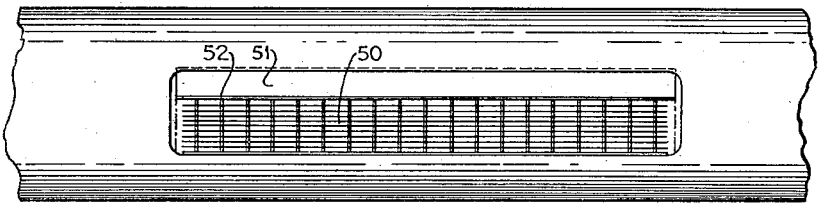
Figure 4 is a front elevation view of the portion of the wing incorporating such radiator unit.

The aerodynamic characteristics of a submerged radiator installation, incorporated in an airplane wing, for example, such as shown in Figures 3 and 4, may similarly be maintained substantially constant as flow through the radiator is restricted. In this arrangement, likewise, the total quantity of air entering the passage 5, corresponding to the outer ring cowl 2 in the installation of Figures 1 and 2, will be generally constant however great the restriction of flow through the radiator. The radiator 50 occupies only a portion of the transverse area of this passage, such portion being at the bottom of the passage in the arrangement shown. Thus between the top of the radiator and the roof of the passage 5 is an unobstructed passage 51 which by-passes the radiator 50, corresponding to the annular passage between cowl rings 1 and 2 in Figures 1 and 2. As will be evident from Figure 4, the area of the passage 51 transversely of the direction of air flow is at least not appreciably less than the aggregate area of the radiator interstices, and preferably is approximately equal to it.

A pivoted control vane 52 is located behind the radiator 50, which may swing between the solid line position shown in Figure 3, in which the passage 51 is entirely closed, and the broken line position, in which the passage 51 is fully open. A divider fin 52 may extend forward from the radiator to separate the inlets to these passages. With the vane in the solid line position shown all the air will flow through the radiator, and as it is swung toward the broken line position the radiator discharge passage is gradually restricted, while the outlet from passage 51 is differentially enlarged so that the flow through it increases. When the vane reaches the broken line position no air can pass through the radiator, yet still at least almost as much air as previously will enter the passage 5, flowing through the installation entirely by way of bypass passage 51.

Thus, as with the installation of Figures 1 and 2, since the air flow into the passage 5 will be approximately constant for all positions of control vane 52, the effect of such flow on the airplane wing may be calculated accurately, and proper account taken of it in the wing design, so that the flight characteristics of the airplane will not be changed as the control vane is swung to various positions. The flow over the faired surfaces at the entrance to this passage will also be smooth and at a velocity not appreciably greater than the air speed of the airplane. No excessive resistance will occur, therefore, as would be created if the passage were closed as the radiator is restricted, thus forcing the air to flow outward around the wing rather than through the cooling installation.

While the control vanes 3 and 52 may be movable manually by the pilot, or by known mechanical devices, suitable thermostatically controlled mechanism can be provided to swing them automatically as necessary to maintain desired temperatures. The radiator 50 may, of course, be used to cool the liquid of an engine cooling system, oil, or other fluid.

What I claim as my invention is:

1. In an aircraft, cowling for a radial air-cooled engine subjected to flow of air thereover by flight of the aircraft, comprising an inner cowl ring closely encircling the outer ends of the engine cylinders, an outer cowl ring encircling said inner cowl ring and spaced outwardly therefrom to leave a passage therebetween by-passing the engine cylinders, and single flow control means operable compensatively to decrease the opening through such by-pass passage and to increase the opening through said inner cowl ring, or alternatively to decrease the opening through said inner cowl ring and to increase the opening through the by-pass passage, for maintaining substantially constant the composite opening through said outer cowl ring for all adjusted positions of said control means, thereby to maintain substantially constant the air flow conditions past the leading edge of said outer cowl ring.

2. In an aircraft, cowling for a radial air-cooled engine subjected to flow of air thereover by flight of the aircraft, comprising an inner cowl ring closely encircling the outer ends of the engine cylinders, an outer cowl ring encircling said inner cowl ring to define an air passage therebetween, the leading edge of said outer cowl ring projecting forwardly beyond the leading edge of said inner cowl ring and inwardly substantially into registry with the leading edge of said inner cowl ring, and the trailing edge of said outer cowl ring extending a substantial distance beyond the trailing edge of said inner cowl ring, and flow control means operable to close alternatively either the passage through said inner cowl ring or the passage between said cowl rings while simultaneously opening the other passage, for flow of air selectively at all times through one or the other of said passages.

3. In an aircraft, cowling for a radial air-cooled engine subjected to flow of air thereover by flight of the aircraft, comprising an inner cowl ring carried by the engine cylinders and closely encircling the outer ends thereof, an outer cowl ring encircling said inner cowl ring and disposed concentrically therewith to leave a normally unobstructed annular passage therebetween having substantially the same resistance to flow of air therethrough as the resistance to flow of air through said inner cowl ring, said outer cowl ring extending rearwardly a substantial distance beyond the trailing edge of said inner cowl ring, and a plurality of overlapping flaps pivoted upon the trailing edge of said inner cowl ring, and means operable to swing said flaps simultaneously outward toward said outer cowl ring to close and interrupt flow through the annular passage between said cowl rings while simultaneously opening the inner cowling for flow therethrough, and alternatively operable to swing said flaps simultaneously inward to close and interrupt the flow of air through said inner cowl ring while at the same time opening such annular passage for flow of air therethrough.

4. In an aircraft, a wing having a duct therethrough, comprising a radiator mounted in such duct and dividing it into a cooling passage through said radiator and a by-pass passage circumventing said radiator, and a control flap movable to increase the opening through one of such passages and simultaneously to decrease compensatively the opening through the other such passage, for maintaining substantially constant the resistance to flow of air through both passages of the duct for all adjusted positions of said control flap, thereby to maintain substantially constant the total amount of air flowing through said duct and over the vehicle structure at the ends of said duct.

5. In an aircraft, cowling for a radial air-cooled engine subjected to flow of air thereover by flight of the aircraft, comprising an inner cowl ring encircling the engine and engaged with the outer ends of its cylinders to confine within said ring the cooling portions of the engine and defining a passage therethrough for flow of cooling air, an outer cowl ring concentric with said inner cowl ring and spaced therefrom to afford an annular flow passage therebetween, and flow control means movable to restrict one of such passages and simultaneously to open compensatively the other of such passages while maintaining substantially constant the aggregate resistance to flow of air through said two passages and consequently the total amount of air flowing through said outer cowl ring.

6. In an aircraft, cowling for a radial air-cooled engine subjected to flow of air thereover by flight of the aircraft, comprising an inner cowl ring closely encircling the outer ends of the engine cylinders, an outer cowl ring encircling said inner cowl ring to define an air passage therebetween, the leading edge of said outer cowl ring projecting forwardly beyond the leading edge of said inner cowl ring and inwardly substantially into registry with the leading edge of said inner cowl ring, and the trailing edge of said outer cowl ring extending a substantial distance beyond the trailing edge of said inner cowl ring, and flow control means disposed behind the trailing edge of said inner cowl ring and forward of the trailing edge of said outer cowl ring and movable to close alternatively either the passage through said inner cowl ring or the passage between said cowl rings while simultaneously opening the other passage for flow of air selectively at all times through one or the other of said passages.

7. A vehicle structure subjected to flow of air thereover by travel of the vehicle and housing cooling mechanism, comprising a duct through which air is forced by travel of the vehicle, a wall dividing said duct lengthwise into two passages, one being partially obstructed by such cooling mechanism therein but offering substantially the same resistance to flow of air therethrough as the other passage, and flow control means common to such two passages and movable into one of such passages to restrict the passage therethrough and simultaneously out of the other of such passages to open it compensatively, thereby to vary the flow of air over such cooling mechanism while maintaining substantially constant the aggregate resistance to flow of air through said duct passages and consequently the total amount of air flowing through them and over the vehicle structure at the ends of said duct.

8. A vehicle structure subjected to flow of air thereover by travel of the vehicle and housing cooling mechanism, comprising a duct through which air is forced by travel of the vehicle, a wall dividing said duct lengthwise into two passages, one being partially obstructed by such cooling mechanism therein but offering substantially the same resistance to flow of air therethrough as the other passage, and a single flow controlling vane carried by said wall and movable into one of such passages to restrict the passage therethrough and simultaneously out of the other of such passages to open it compensatively, thereby to vary the flow of air over such cooling mechanism while maintaining substantially constant the aggregate resistance to flow of air through said duct passages and consequently the total amount of air flowing through them and over the vehicle structure at the ends of said duct.

9. In an aircraft, cowling for an air-cooled engine subjected to flow of air thereover by flight of the aircraft, comprising cowl means defining a passage housing cooling portions of the engine cylinders, additional cowl means defining a passage alongside such first passage by-passing the cooling portions of the engine cylinders but offering substantially the same resistance to flow of air therethrough as the first passage, and single flow control means operable compensatively to decrease the opening through such by-pass passage and to increase the opening through such first passage, or alternatively to decrease the opening through such first passage and to increase the opening through the by-pass passage, thereby to vary the flow of air over the cooling portions of the engine cylinders while maintaining substantially constant the aggregate resistance to flow of air through both passages and consequently the total amount of air flowing through them and over the aircraft structure at the ends of said cowl means for all adjusted positions of said control means.

GEORGE S. SCHAIRER.

REFERENCES CITED

The following references are of record in the file of this patent:

UNITED STATES PATENTS

| Number | Name | Date |
| --- | --- | --- |
| 1,412,073 | Wagenseil | Apr. 11, 1922 |
| 1,712,622 | Kruckenberg et al. | May 14, 1929 |
| 1,915,298 | Diehl | June 27, 1933 |
| 2,049,751 | Shoemaker | Aug. 4, 1936 |
| 2,077,708 | Morse | Apr. 20, 1937 |
| 2,087,832 | Birkigt | July 20, 1937 |
| 2,206,418 | Mercier | July 2, 1940 |
| 2,244,594 | Amiot | June 3, 1941 |

FOREIGN PATENTS

| Number | Country | Date |
| --- | --- | --- |
| 471,639 | Great Britain | Sept. 8, 1937 |

OTHER REFERENCES

Page 74 of "Aircraft Engineering," March 1942.